United States Patent
Hirai et al.

(10) Patent No.: US 7,217,929 B2
(45) Date of Patent: May 15, 2007

(54) RADIATION DETECTOR

(75) Inventors: Tadaaki Hirai, Hamamatsu (JP);
Yasuhiro Tomita, Hamamatsu (JP);
Masanori Kinpara, Hamamatsu (JP);
Michiatsu Nakada, Hamamatsu (JP);
Yuji Shirayanagi, Hamamatsu (JP);
Shinjiro Matsui, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 14 days.

(21) Appl. No.: 10/525,248

(22) PCT Filed: Aug. 20, 2003

(86) PCT No.: PCT/JP03/10526

§ 371 (c)(1),
(2), (4) Date: Feb. 22, 2005

(87) PCT Pub. No.: WO2004/019060

PCT Pub. Date: Mar. 4, 2004

(65) Prior Publication Data

US 2005/0230628 A1    Oct. 20, 2005

(30) Foreign Application Priority Data

Aug. 21, 2002   (JP) ............................ 2002-240841

(51) Int. Cl.
*G01T 1/24* (2006.01)
(52) U.S. Cl. .................. 250/370.01; 600/474; 600/549
(58) Field of Classification Search ........... 250/370.01, 250/336.1, 343, 505.1; 600/436, 474, 549
See application file for complete search history.

(56) References Cited

U.S. PATENT DOCUMENTS

| | | | | |
|---|---|---|---|---|
| 4,959,547 A | * | 9/1990 | Carroll et al. | 250/336.1 |
| 5,068,883 A | * | 11/1991 | DeHaan et al. | 378/86 |
| 6,204,505 B1 | * | 3/2001 | Call | 250/370.01 |
| 6,219,573 B1 | * | 4/2001 | Pompei | 600/474 |
| 6,236,880 B1 | * | 5/2001 | Raylman et al. | 600/436 |
| 7,022,993 B1 | * | 4/2006 | Williams et al. | 250/343 |
| 2001/0027274 A1 | * | 10/2001 | Pompei | 600/474 |
| 2004/0122338 A1 | * | 6/2004 | Pompei | 600/549 |
| 2004/0176700 A1 | * | 9/2004 | Potter | 600/549 |
| 2005/0199818 A1 | * | 9/2005 | Tomita et al. | 250/370.01 |
| 2005/0263707 A1 | * | 12/2005 | Tomita et al. | 250/370.01 |
| 2006/0036137 A1 | * | 2/2006 | Lewicke | 600/301 |

FOREIGN PATENT DOCUMENTS

| | | |
|---|---|---|
| JP | 02-206787 | 8/1990 |
| JP | 5-500415 | 1/1993 |
| JP | 06-331934 | 12/1994 |
| JP | 07-055943 | 3/1995 |

* cited by examiner

*Primary Examiner*—David Porta
*Assistant Examiner*—Faye Boosalis
(74) *Attorney, Agent, or Firm*—Drinker Biddle & Reath LLP

(57) ABSTRACT

When the distal end of a radiation detection probe (2) is directed toward a place to be measured, pointer light emitted by a light-emitting device (7) sequentially passes through a transmission window (5C) of a radiation detection element (5) and a projection window (3E) of a probe cover (3) to be emitted onto the place to be measured. This pointer light clearly indicates the place as a bright spot. The radiation from the place passes through the distal end of the probe cover (3) to be collimated by a radiation-introducing window (4A) of a side shield (4), and then enters the radiation detection element (5). The dose of the radiation is detected in this way.

19 Claims, 13 Drawing Sheets

RADIATION DETECTOR

TECHNICAL FIELD

The present invention relates to a handheld radiation detector and, more particularly, to a radiation detector which has a radiation detection probe.

BACKGROUND ART

A handheld medical radiation detector is disclosed in U.S. Pat. No. 6,236,880 B1. This radiation detector has a probe and a probe detachably mounted to the distal end of the probe.

Common radiation detectors with a radiation detection probe are designed to bring the tip of the probe into contact with a place to be measured or as close as possible to the place in order to detect the radiation. Therefore, when the tip of the probe is far from the place from which the radiation is being detected, it is difficult for the user to locate the place.

DISCLOSURE OF THE INVENTION

An object of the present invention is to provide a radiation detector which facilitates locating the place from which the radiation is being detected.

A radiation detector according to the present invention comprises a main body, and a radiation detection probe connected to the main body. The radiation detection probe includes a radiation detection element for detecting radiation transmitted through the distal end of the radiation detection probe, a light-emitting device for emitting pointer light toward the distal end of the radiation detection probe, and a first window provided on the distal end of the radiation detection probe to transmit the pointer light.

The radiation detection element may be disposed between the distal end of the radiation detection probe and the light-emitting device, and has a second window for transmitting the pointer light. In this case, the pointer light passes through the second window and then the first window to be emitted from the is radiation detection probe. The radiation detection element may be divided into a plurality of element pieces which are arranged to surround the second window.

The radiation detection probe may further include a condenser lens provided in the first window.

The radiation detector may further comprise an optical guide for guiding the pointer light from the light-emitting device to the first window. The optical guide may have a pipe extending from the light-emitting device to the first window. This pipe may pass through a second window of the radiation detection element. An optical fiber may be placed in this pipe.

The radiation detection probe may further include an light-blocking cover which covers the light-emitting device. In this case, the optical guide may have a through-hole provided in the light-blocking cover. The aforementioned pipe may have a hollow portion which communicates with the through-hole.

The radiation detection probe may further include a collimator disposed between the distal end of the radiation detection probe and the radiation detection element to collimate the radiation. The first window may be placed on the center axis of the collimator. In this case, since the pointer light is emitted toward the center of a place to be measured, it is possible to indicate the place to be measured more accurately by the pointer light. When the radiation detection element has a second window, both the first and second windows are preferably placed on the center axis of the collimator.

The radiation detection probe may further include an input plate provided on the distal end of the radiation detection probe. The input plate may block an electromagnetic wave having an energy of 1 keV or less.

The present invention will be fully understood when taken with the following detailed descriptions and the accompanying drawings. The accompanying drawings are only illustrative, and therefore it is to be understood that the accompanying drawings are not considered to limit the present invention.

A further applicable scope of the invention will become apparent from the following detailed descriptions. However, the detailed descriptions and specific examples describe the preferred embodiments of the invention but are only illustrative thereof. It will thus become apparent to those skilled in the art from the detailed descriptions that various modifications and variations can be made without departing from the scope of the invention.

BEST MODES FOR CARRYING OUT THE INVENTION

Figure 1:
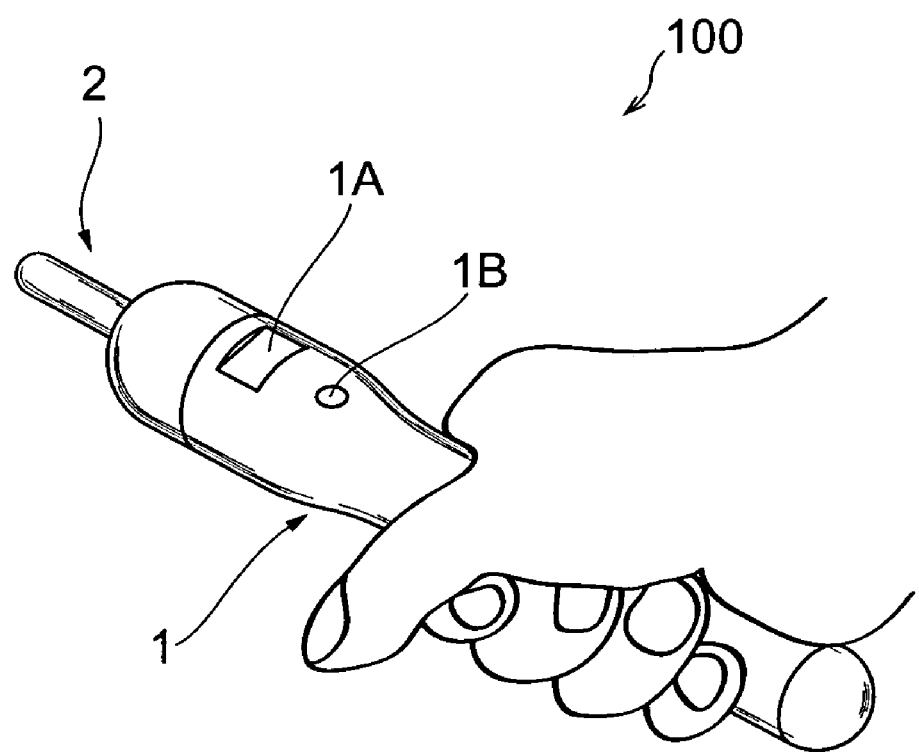
FIG. 1 is a perspective view showing a radiation detector according to a first embodiment.

The present invention will now be described below in more detail with reference to the accompanying drawings in accordance with the embodiments. In the drawings, identical elements are indicated by identical symbols and overlapping description will be omitted.

First Embodiment

Figure 2:
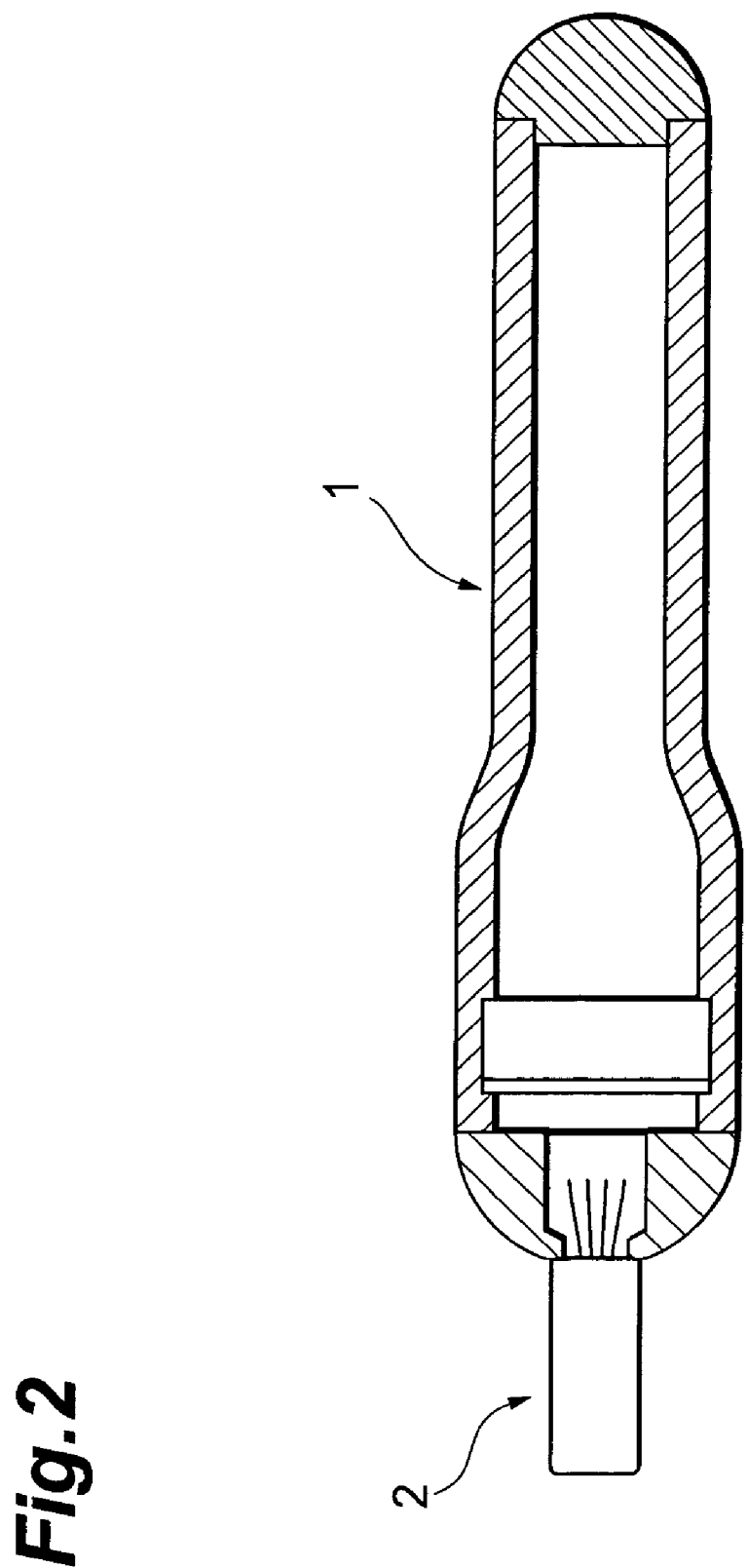
FIG. 2 is a longitudinal sectional view of the radiation detector shown in FIG. 1.
Figure 3:
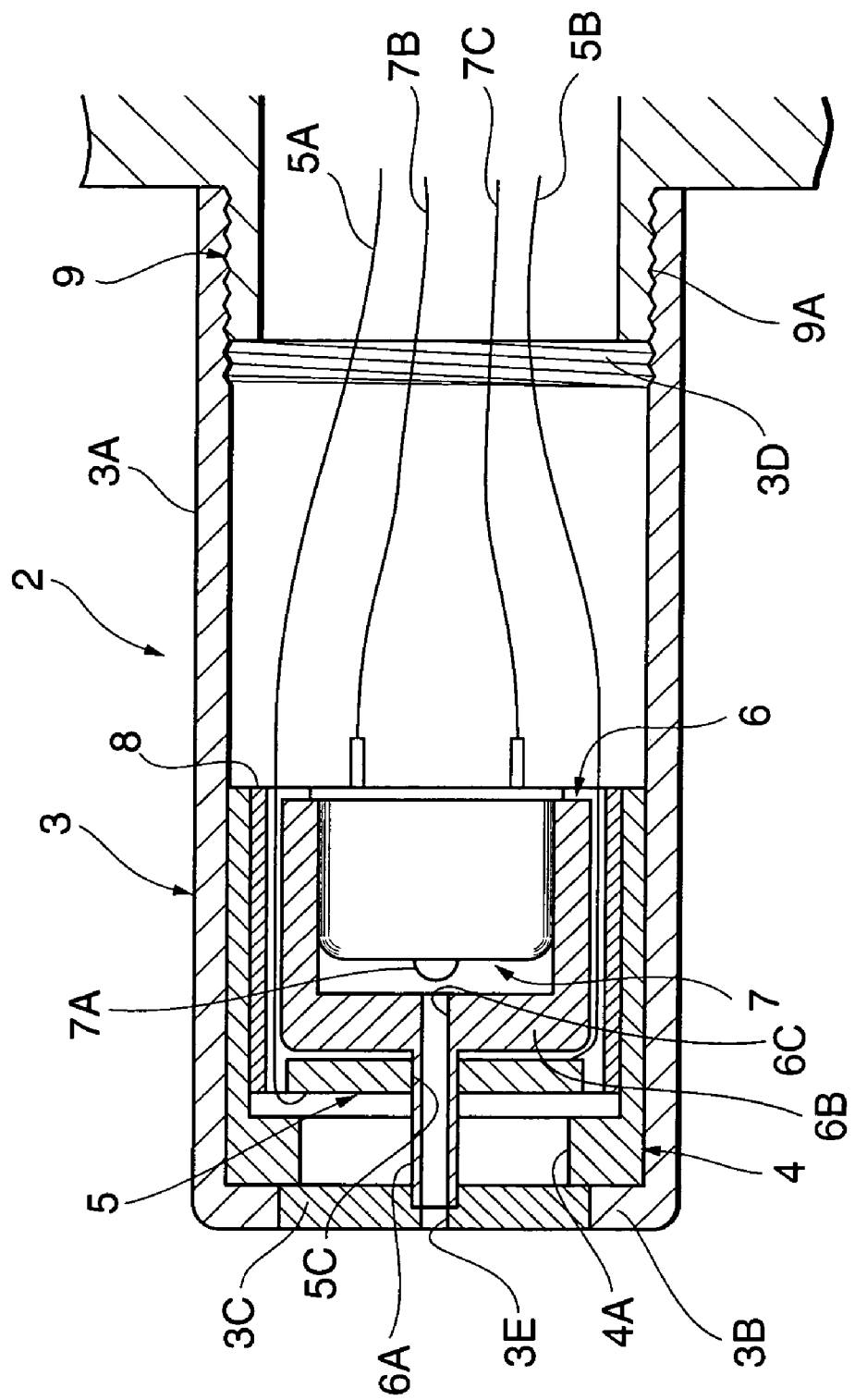
FIG. 3 is an enlarged sectional view of the radiation detection probe shown in FIG. 2.
Figure 4:
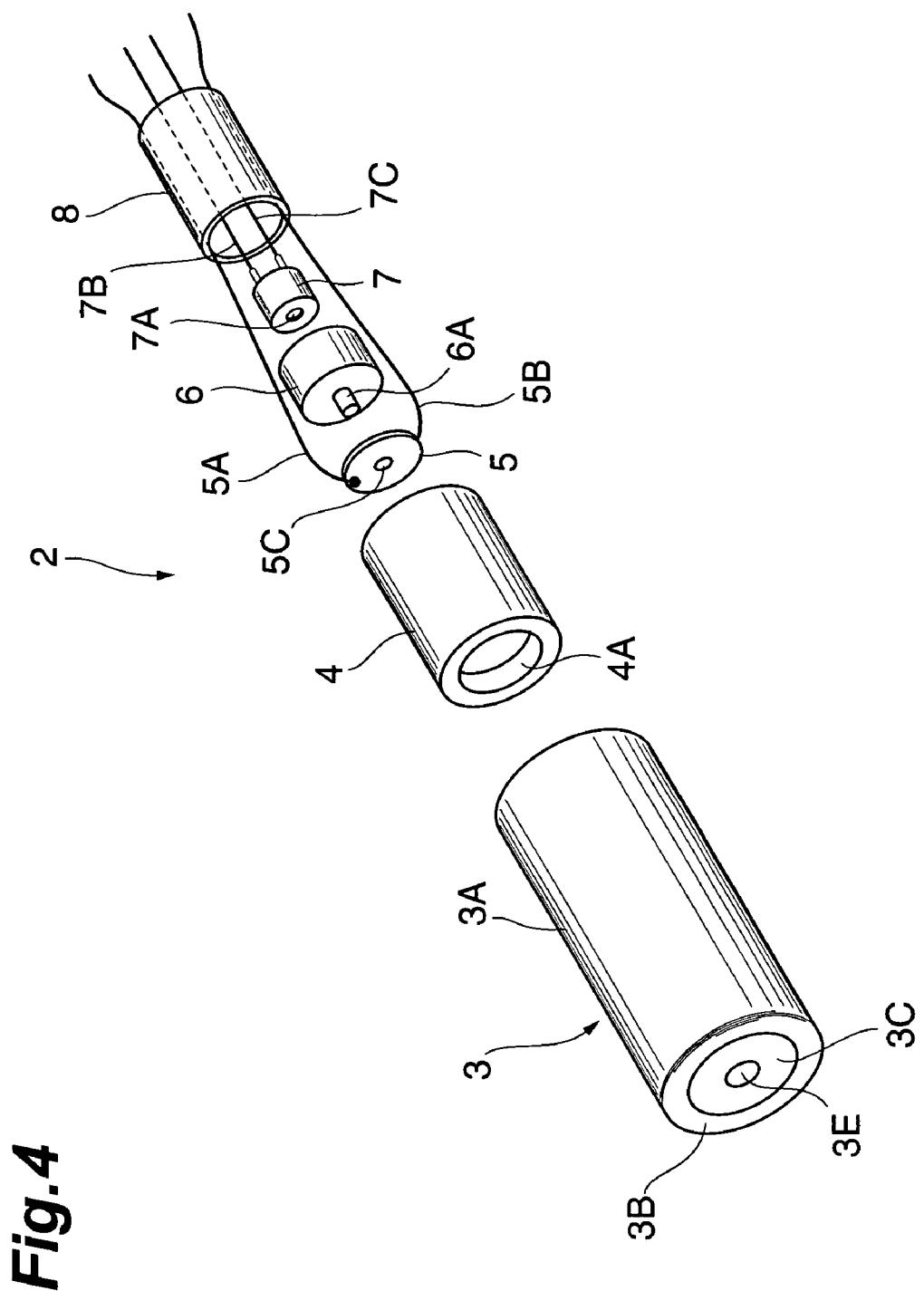
FIG. 4 is an exploded perspective view of the radiation detection probe shown in FIG. 3, when viewed from its distal end side.

FIG. 1 is a perspective view showing a radiation detector according to this embodiment. FIG. 2 is a longitudinal sectional view showing the radiation detector shown in FIG. 1. FIG. 3 is an enlarged sectional view showing the assembled radiation detection probe shown in FIG. 2. FIG. 4 is an exploded perspective view showing the components of the radiation detection probe shown in FIG. 3, when viewed from the distal end side of the radiation detection probe.

A radiation detector 100 is a handheld, cordless, surgical probe. As shown in FIG. 1, the radiation detector 100 has a main body 1, and a radiation detection probe 2 provided on the distal end of the main body 1 so as to protrude from the main body 1. The radiation detector 100 is manipulated by grasping the main body 1. For example, the radiation detector 100 is used for detecting a metastatic breast cancer nidus using a radiative medicine. A liquid crystal display panel 1A and a switch 1B are provided on the surface of the main body 1.

As shown in FIG. 2, the main body 1 is hollow. Although not shown, a signal processing circuit, a drive circuit, an electronic sound generator, a power supply circuit, a battery and the like are provided inside the main body 1. The signal processing circuit processes a detection signal sent from the radiation detection probe 2 to generate a data signal indicative of the radiation dose. The data signal is sent to the drive circuit. The drive circuit displays the radiation dose indicated by the data signal on the display panel 1A as well as drives the electronic sound generator to produce an electronic sound corresponding to the radiation dose.

As shown in FIG. 3 and FIG. 4, the radiation detection probe 2 is covered with a cylindrical cap-shaped probe cover 3. In the probe cover 3, a side shield 4, a radiation detection element 5, a light-blocking cover 6, a light-emitting device 7 and the like are provided. The radiation detection element 5 and the light-blocking cover 6 are surrounded by a cylindrical casing 8.

The probe cover 3 has an approximately cylindrical cover main body 3A. The cover main body 3A has an annular protrusion 3B which extends radially and inwardly at the distal end of the cover main body 3A. A circular input plate 3C fits into the inner circumference surface of the annular protrusion 3B. The input plate 3C is fixed using an adhesive etc., so as to seal the probe cover 3.

The cover main body 3A is made of, for example, a metal material such as stainless steel or aluminum, or an electrically conductive resin material. An internal thread 3D is formed on the inner circumference surface of the proximal end portion of the cover main body 3A. The internal thread 3D screws onto an external thread 9A of the connector 9 provided on the distal end of the main body 1.

On the other hand, the input plate 3C is made of a material, e.g., aluminum or amorphous carbon, which blocks visible light and infrared light but transmits the radiation to be detected. This is because incidence of electromagnetic waves other than the radiation to be detected upon the radiation detection element 5 generates noise signals. Preferably, the input plate 3C is made of a material which blocks electromagnetic waves having an energy of 1 keV or less but transmits the radiation to be detected. At the center of the input plate 3C, a projection window 3E which transmits pointer light, described later, is formed on the center axis of the side shield 4.

The radiation detection element 5 is a semiconductor element which generates a voltage pulse having a pulse height corresponding to the energy of the radiation photon. The detecting element 5 has a disk shape with a size sufficient to be accommodated in the casing 8. Lead wires 5A and 5B for outputting detection signals are connected to the front surface (a detecting face) and the rear surface of the radiation detection element 5. The lead wires 5A and 5B are electrically connected to a signal processing circuit (not shown) in the main body 1.

The side shield 4 is a component for enhancing the directivity in the detection of radiation. The side shield 4 is made of a material which is capable of blocking the radiation, e.g., lead (Pb) or tungsten (W). This material may be coated with rubber. The side shield 4 is an approximately cylindrical member which fits into the hollow portion of the probe cover 3. The hollow portion of the side shield 4 fits onto the casing 8. A radiation-introducing window 4A facing both the input plate 3C and the radiation detection element 5 is provided in a front wall disposed at the distal end of the side shield 4. The window 4A is a cylindrical through-hole provided on the center axis of the side shield 4. The radiation passes through the window 4A to enter the radiation detection element 5. The side shield 4 is fitted into and fixed in the cover main body 3A so as to abut the rear surface of the annular protrusion 3B.

Since the side shield 4 covers the side surface of the radiation detection element 5, the radiation from the side of the radiation detection element 7 is prevented from entering the radiation detection element 7. As a result, only the radiation from the direction in which the radiation detection probe 2 is directed is detected, whereby the directivity in the detection of radiation is improved. Furthermore, the side shield 4, which has the window 4A, also serves as a collimator for the radiation. The window 4A is formed coaxial with the side shield 4, thereby allowing only such radiation as traveling approximately in parallel to the axis of the window 4A and the side shield 4 to enter the radiation detection element 5. This is the collimating operation of the window 4A. Such an operation of the collimator will further improve the directivity in the detection of radiation.

At the center of the radiation detection element 5, there is formed a transmission window 5C. The transmission window 5C is a through-hole which extends along the center axis of the side shield 4 and passes through the radiation detection element 5. The transmission window 5C is for transmitting pointer light, which is described later. In this embodiment, the transmission window 5C has a size sufficient to accommodate a pipe 6A which protrudes from the light-blocking cover 6, which is described later.

The light-blocking cover 6 has the shape of a cylindrical cap. The light-blocking cover 6 as well as the radiation detection element 5 is housed and held in the casing 8. The light-blocking cover 6 is disposed immediately behind the radiation detection element 5. The hollow portion of the light-blocking cover 6 fits onto the light-emitting device 7 to hold it. The pipe 6A protrudes from a front wall 6B of the light-blocking cover 6. The pipe 6A passes through the transmission window 5C of the radiation detection element 5 and extends up to the projection window 3E of the probe cover 3. The distal end of the hollow portion of the pipe 6A communicates with the projection window 3E, while the proximal end of the hollow portion of the pipe 6A communicates with a through-hole 6C formed in the front wall 6B and the hollow portion of the light-blocking cover 6. Thus, the pipe 6A and the through-hole 6C form an optical guide which extends from the light-emitting device 7 to the projection window 3E along the center axis of the side shield 4.

The light-emitting device 7 includes a semiconductor light-emitting device such as a laser diode or a light-emitting diode, and emits a directional beam of pointer light from a light-emitting portion 7A. The light-emitting device 7 is connected to a power supply circuit (not shown) in the main body 1 via lead wires 7B and 7C. The light-emitting portion 7A is disposed on the center axis of the side shield 4 behind the radiation detection element 5 and faces the through-hole 6C of the light-blocking cover 6.

The casing 8 is fitted into the hollow portion of the side shield 4 to be fixed, while housing and holding the radiation detection element 5 and the light-blocking cover 6. The casing 8 is made of, for example, a resin material such as polyoxymethylene or an electrically conductive metal material.

The radiation detector 100 is, for example, used for detecting a metastatic breast cancer nidus using a radiative medicine. When the distal end of the radiation detection probe 2 is directed to a portion to be measured of a patient without contacting the portion, the directional pointer light from the light-emitting portion 7A of the light-emitting device 7 is guided by the through-hole 6C of the light-blocking cover 6 and the pipe 6A so as to be emitted to the portion to be measured from the projection window 3E of the probe cover 3. This directional pointer light clearly indicates the portion to be measured of the patient as a bright spot.

The radiation emitted from the portion to be measured which is indicated by the pointer light passes through the input plate 3C of the probe cover 3 and the radiation-introducing window 4A of the side shield 4 to enter the radiation detection element 5. The side shield 46 and the window 4A block the radiation from portions other than the portion to be measured. This allows the radiation detection element 5 to detect the dose of the radiation from the portion to be measured with high accuracy.

The radiation detection element 5 generates a detection signal corresponding to the radiation dose. The detection signal is sent to a signal processing circuit (not shown) in the main body 1 via the lead wires 5A and 5B. The signal processing circuit processes the detection signal to generate a data signal indicative of the radiation dose. The radiation dose based on the data signal is displayed on the liquid crystal display panel 1A. Also, an electronic sound is generated corresponding to the radiation dose.

Thus, the directional pointer light is guided by an optical guide, i.e., the pipe 6A and the through-hole 6C to the projection window 3E. This makes it possible to reliably emit the pointer light from the projection window 3E to the portion to be measured. As a result, the user of the radiation detector 100 can readily determine the place from which the radiation is being detected.

In particular, this embodiment allows the radiation from the portion to be measured indicated by the pointer light to accurately enter the radiation detection element 5. This is because the transmission window 5C and the projection window 3E are placed on the center axis of the side shield 4, and the optical axis of the pointer light guided by the pipe 6A and the through-hole 6C is aligned with the center axis of the side shield 4. Since the pointer light is emitted to the center of the portion to be measured, the pointer light provides a more accurate indication of the portion to be measured. Consequently, the radiation from the portion to be measured can be detected with accuracy.

Referring to FIG. 5 to FIG. 11, second to eighth embodiments in accordance with the present invention will now be described. These embodiments are different from the first embodiment in the structure of the radiation detection element 5, and the other structures are configured in the same manner as in the first embodiment. That is, a radiation detector according to these embodiments is designed such that the radiation detection element 5 according to the first embodiment is replaced by a radiation detection element shown in FIG. 5 to FIG. 11. As shown in FIG. 5 to FIG. 11, in these embodiments, the radiation detection element is divided into a plurality of element pieces which are placed around a transmission window. This eliminates the need for complicated machining by which the transmission window is formed in the radiation detection element. Hence, the radiation detection element according to the second to eighth embodiments can be readily manufactured.

Second Embodiment

Figure 5:
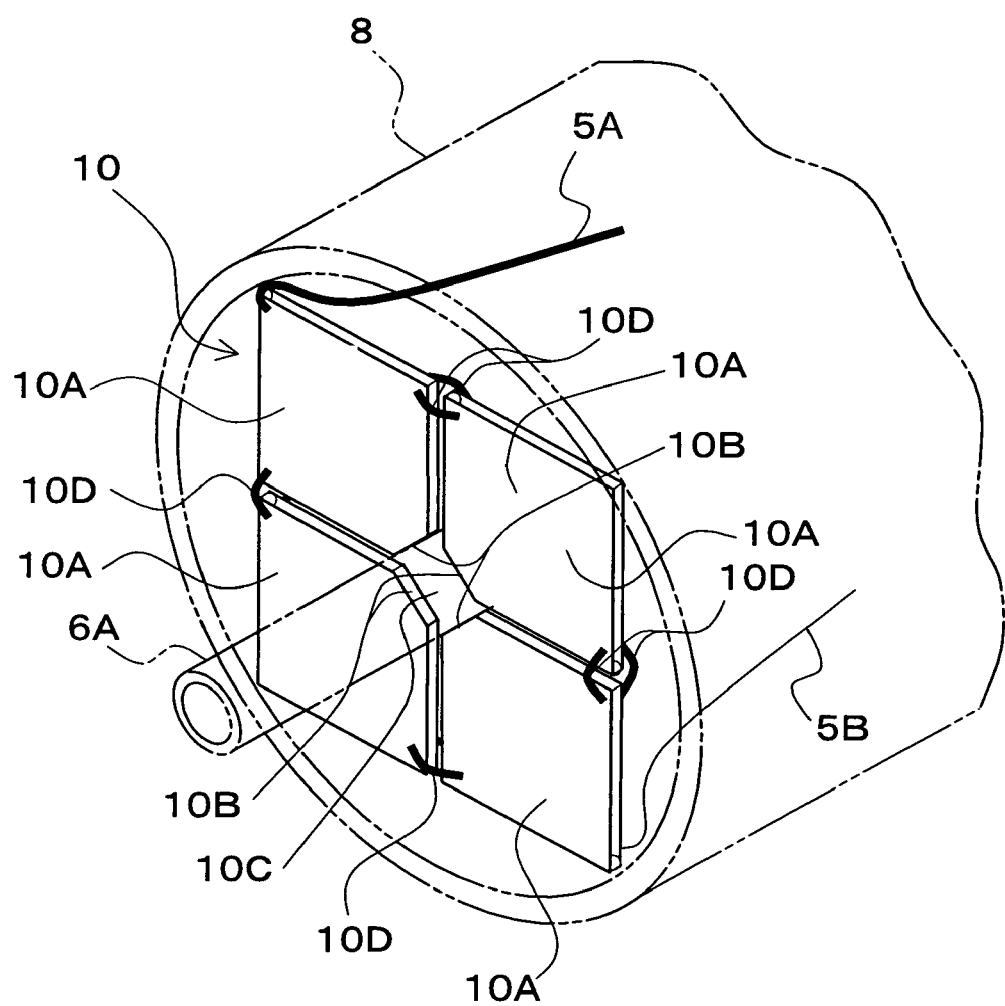
FIG. 5 is a perspective view showing a radiation detection element according to a second embodiment.

The radiation detector according to the second embodiment is configured by replacing the radiation detection element 5 in the first embodiment with a radiation detection element 10 shown in FIG. 5. The radiation detection element 10 includes four approximately square element pieces 10A. Each of the element pieces 10A has a diagonal notch 10B formed at one of the corners. These element pieces 10A are arranged such that the notches 10B face each other to define a transmission window 10C.

The front surfaces (detecting faces) of these element pieces 10A are connected to each other in parallel using jumper wires 10D. Additionally, the rear surfaces of the element pieces 10A are also connected to each other using jumper wires 10D. The front surface of one of the element pieces 10A is connected with the lead wire 5A, while the rear surface of another one of the element pieces 10A is connected with the lead wire 5B. The radiation detection element 10 is housed in the casing 8, and the pipe 6A of the light-blocking cover 6 is inserted into the transmission window 10C surrounded by the notches 10B.

Third Embodiment

Figure 6:
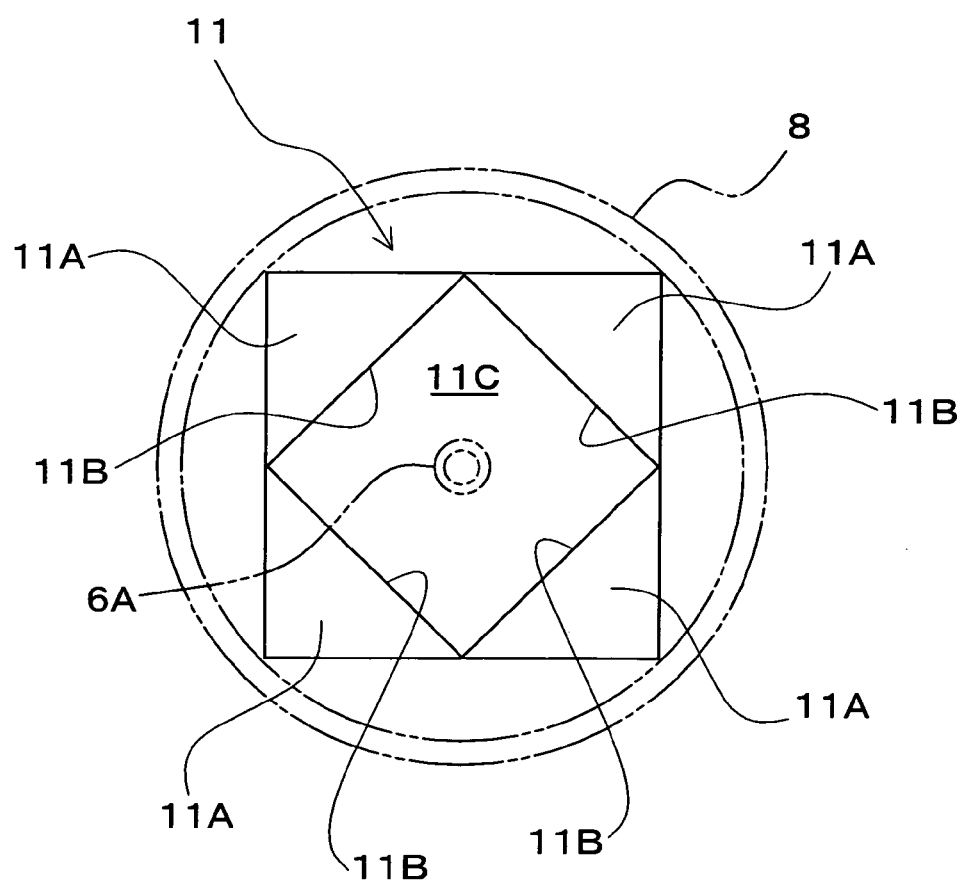
FIG. 6 is a perspective view showing a radiation detection element according to a third embodiment.

A radiation detector according to the third embodiment is configured by replacing the radiation detection element 5 in the first embodiment with a radiation detection element 11 shown in FIG. 6. The radiation detection element 11 includes four element pieces 11A which are right-angled isosceles triangles. These element pieces 11A are arranged in both the vertical and horizontal directions with their diagonal sides 11B facing their corresponding ones. These diagonal sides 11B define a square transmission window 11C. The pipe 6A of the light-blocking cover 6 is inserted into the transmission window 11C surrounded by the diagonal sides 11B.

Although not shown, each of the element pieces 11A is connected with jumper wires and lead wires which are similar to the jumper wires 10D and the lead wires 5A and 5B shown in FIG. 5. Radiation detection elements 12 to 16 shown in FIG. 7 to FIG. 11 are also connected with jumper wires and lead wires in the same manner as in the radiation detection element 10.

Fourth Embodiment

Figure 7:
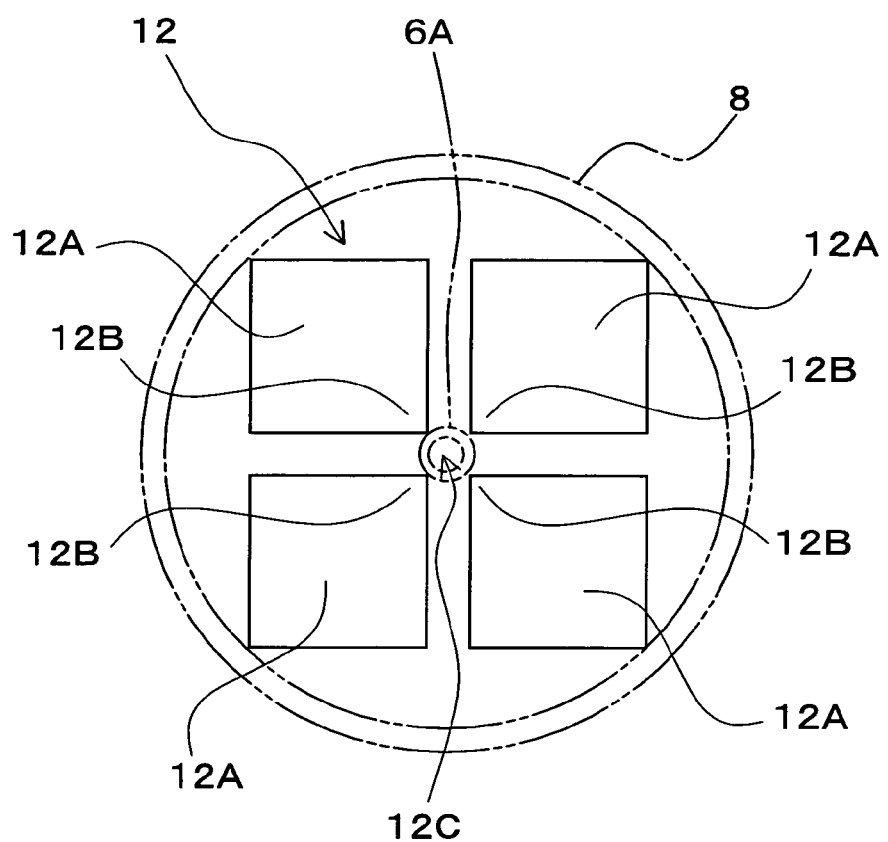
FIG. 7 is a perspective view showing a radiation detection element according to a forth embodiment.

A radiation detector according to the fourth embodiment is configured by replacing the radiation detection element 5 in the first embodiment with a radiation detection element 12 shown in FIG. 7. The radiation detection element 12 includes four square element pieces 12A. These element pieces 12A are arranged with their corners 12B facing each other. These corners 12B define a transmission window 12C. The pipe 6A of the light-blocking cover 6 is inserted into the transmission window 12C surrounded by the corners 12B.

Fifth Embodiment

Figure 8:
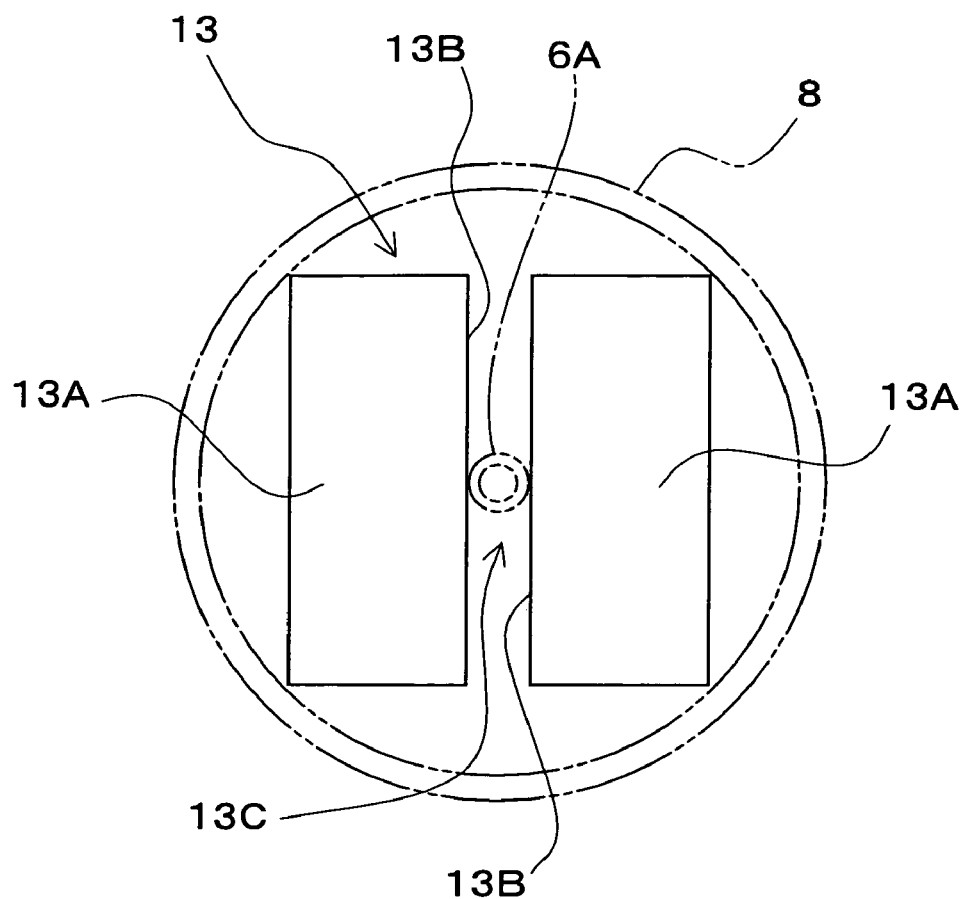
FIG. 8 is a perspective view showing a radiation detection element according to a fifth embodiment.

A radiation detector according to the fifth embodiment is configured by replacing the radiation detection element 5 in the first embodiment with a radiation detection element 13 shown in FIG. 8. The radiation detection element 13 includes two rectangular element pieces 13A. These element pieces 13A are arranged with their longer sides 13B facing each other. These longer sides 13B define a transmission window 13C. The pipe 6A of the light-blocking cover 6 is inserted into the transmission window 13C formed between the longer sides 13B.

Sixth Embodiment

Figure 9:
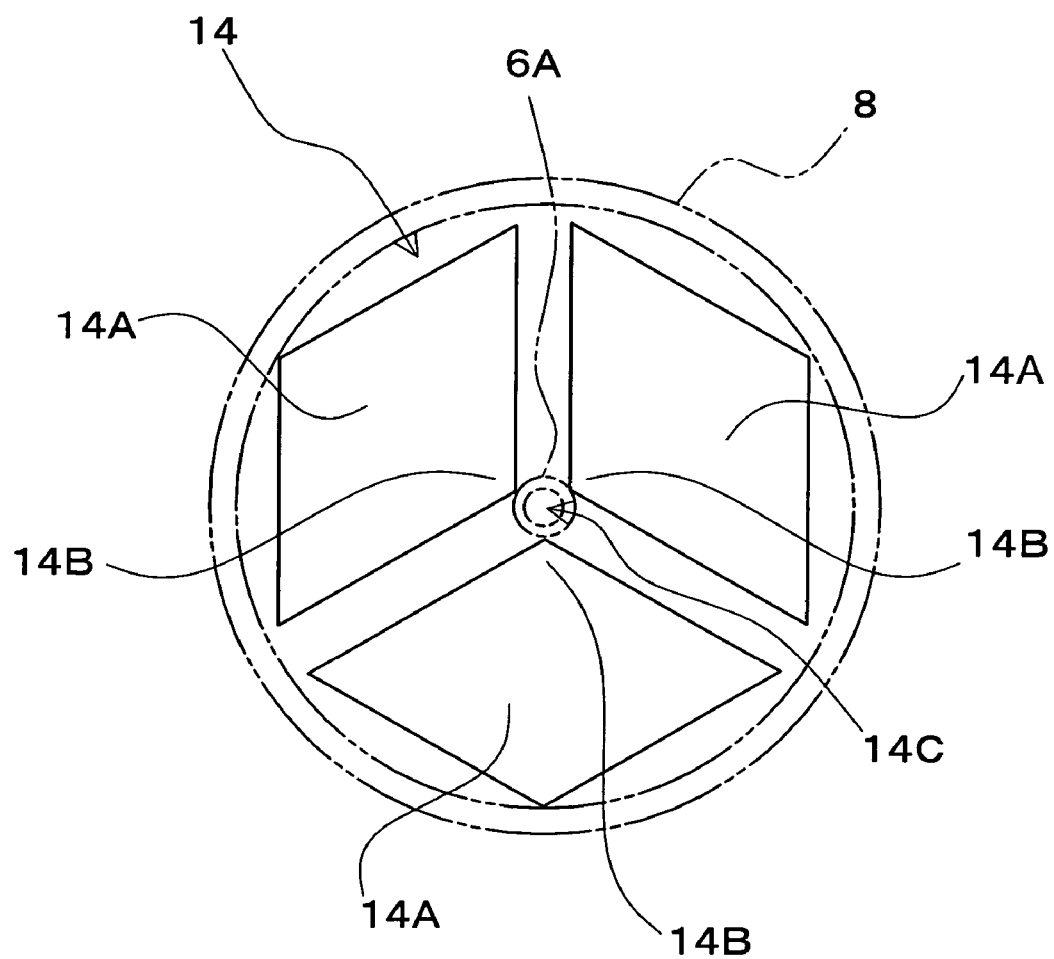
FIG. 9 is a perspective view showing a radiation detection element according to a sixth embodiment.

A radiation detector according to the sixth embodiment is configured by replacing the radiation detection element 5 in the first embodiment with a radiation detection element 14 shown in FIG. 9. The radiation detection element 14 includes three rhombus element pieces 14A. These element pieces 14A are arranged with their obtuse corners 14B facing each other. These corners 14B define a transmission window 14C. The pipe 6A of the light-blocking cover 6 is inserted into the transmission window 14C surrounded by the corners 14B.

Seventh Embodiment

Figure 10:
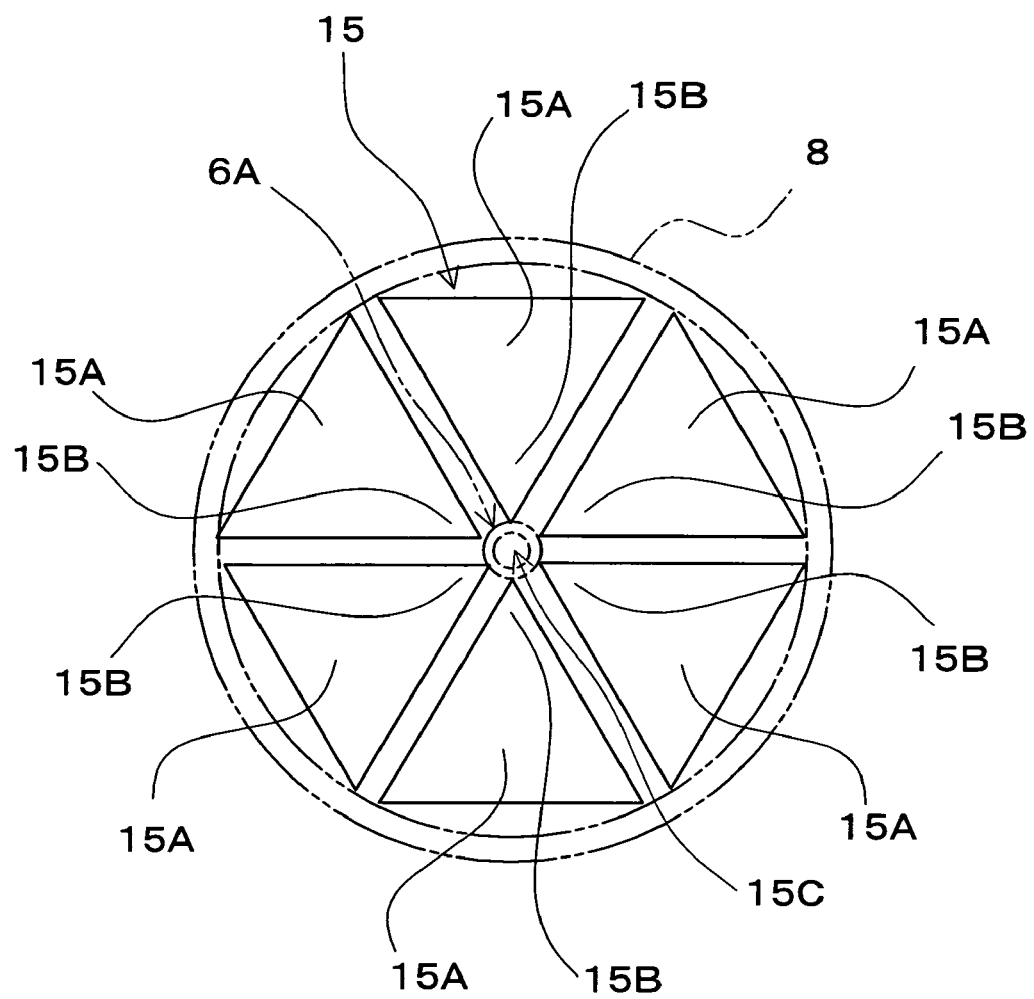
FIG. 10 is a perspective view showing a radiation detection element according to a seventh embodiment.

A radiation detector according to the seventh embodiment is configured by replacing the radiation detection element 5 in the first embodiment with a radiation detection element 15 shown in FIG. 10. The radiation detection element 15 includes six regular triangular element pieces 15A. These element pieces 15A are arranged with their corners 15B facing each other. These corners 15B define a transmission window 15C. The pipe 6A of the light-blocking cover 6 is inserted into the transmission window 15C surrounded by the corner portions 15B.

Eighth Embodiment

Figure 11:
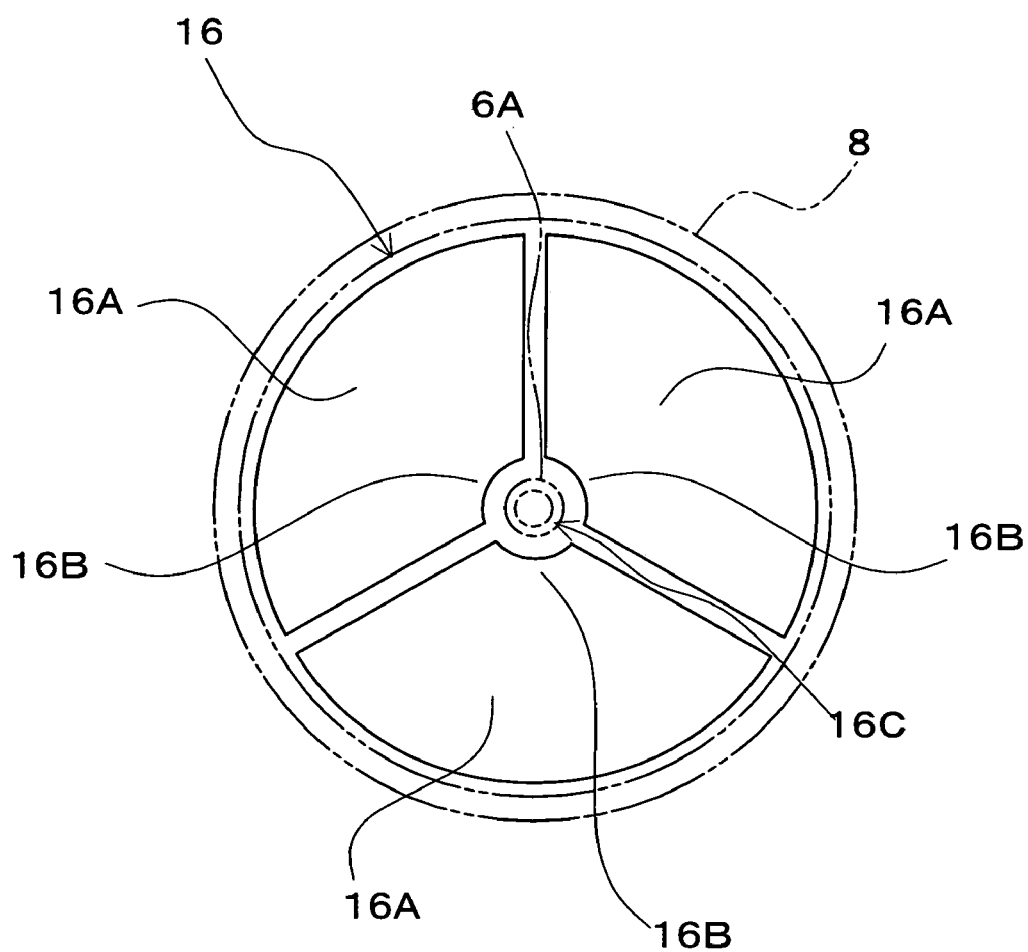
FIG. 11 is a perspective view showing a radiation detection element according to a eighth embodiment.

A radiation detector according to the eighth embodiment is configured by replacing the radiation detection element 5 in the first embodiment with a radiation detection element 16 shown in FIG. 11. The radiation detection element 16 includes three element pieces 16A each having a sector shape. These element pieces 16A are arranged with their smaller arcs 16B facing each other. These arcs 16B define a transmission window 16C. The pipe 6A of the light-blocking cover 6 is inserted into the transmission window 16C surrounded by the smaller arcs 16B.

Ninth Embodiment

Figure 12:
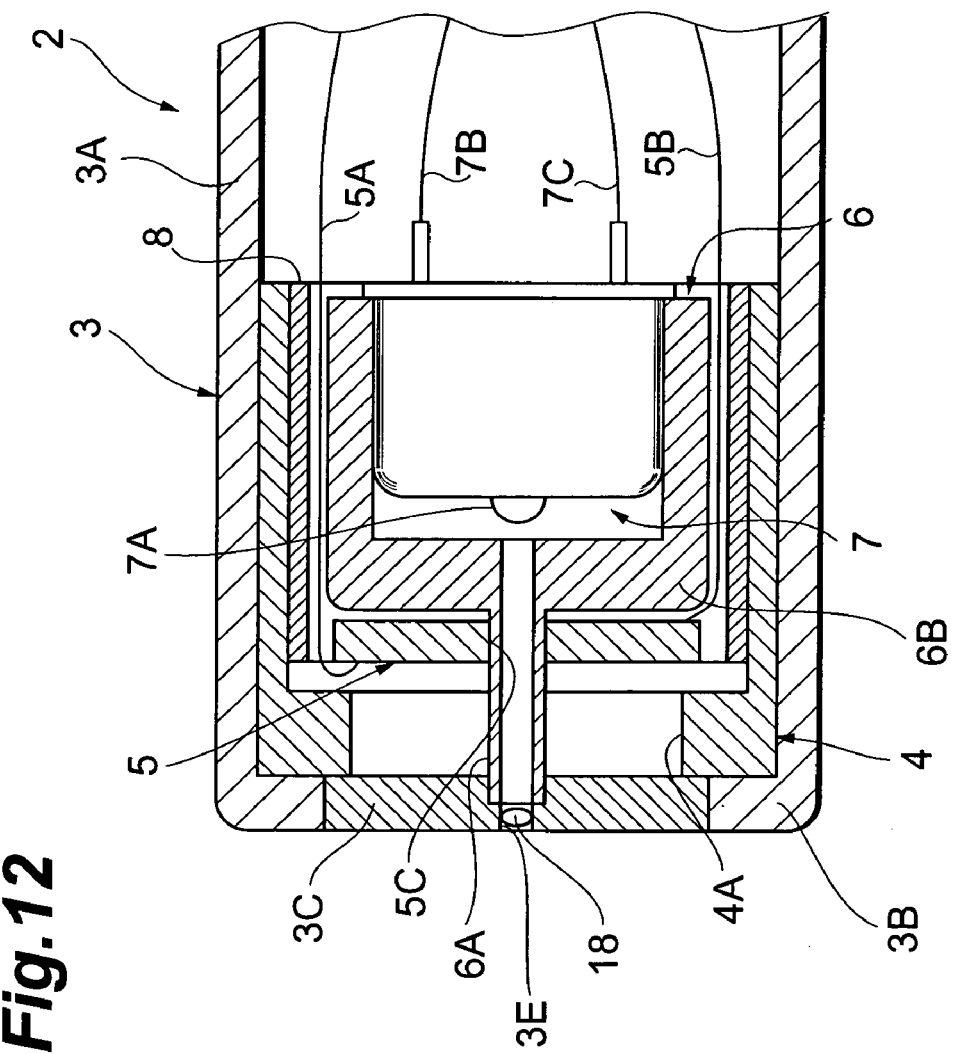
FIG. 12 is an enlarged sectional view showing an assembled radiation detection probe according to a ninth embodiment.

Referring to FIG. 12, a ninth embodiment of the present invention will now be described. This embodiment is configured in the same manner as the first embodiment except that a condenser lens 18 is placed in the projection window 3E. The condenser lens 18 condenses the pointer light from the light-emitting portion 7A. This prevents the diffusion of the pointer light to enhance the directivity of the pointer light. As a result, the pointer light is emitted from the projection window 3E to a portion to be measured more reliably. This allows the user of the radiation detector to more readily determine the place from which the radiation is being detected.

In this embodiment, the radiation detection element according to the second to eighth embodiments may be used instead of the radiation detection element 5.

Tenth Embodiment

Figure 13:
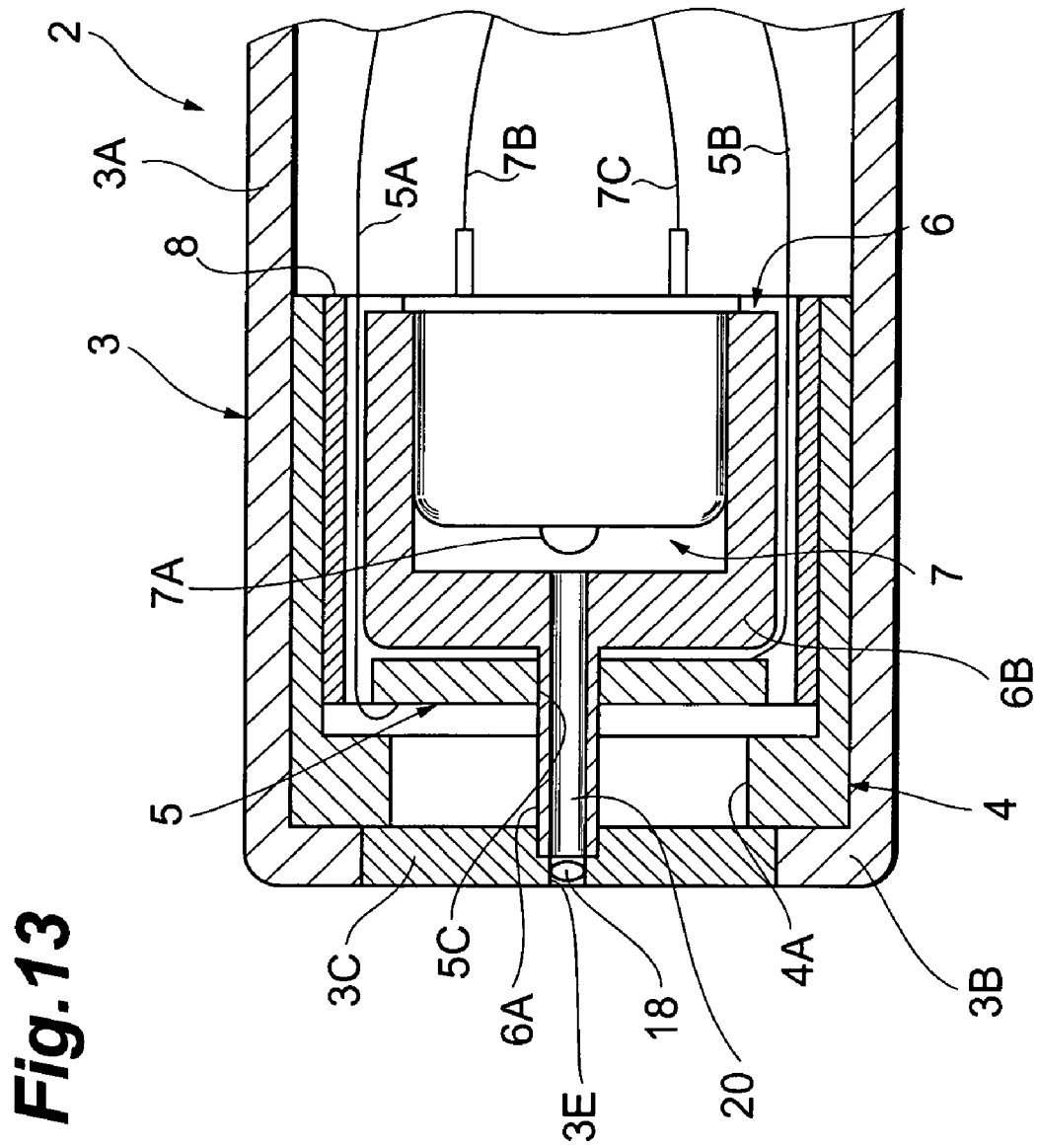
FIG. 13 is an enlarged sectional view showing an assembled radiation detection probe according to a tenth embodiment.

Referring to FIG. 13, a tenth embodiment of the present invention will now be described. This embodiment is configured in the same manner as the ninth embodiment except that an optical fiber 20 is placed in the hollow portion of the pipe 6A. The optical fiber 20 is optically coupled to the light-emitting portion 7A and the condenser lens 18. The optical fiber 20 receives the pointer light from the light-emitting portion 7A and then sends it to the condenser lens 18. Since the optical fiber 20 suppresses attenuation of the pointer light, the pointer light is emitted from the projection window 3E to a portion to be measured more reliably. This allows the user of the radiation detector to more readily determine the place from which the radiation is being detected.

In this embodiment, the radiation detection element according to the second to eighth embodiments may be used instead of the radiation detection element 5.

In the foregoing, the present invention has been described in detail in accordance with the embodiments. However, the present invention is not limited to the above-mentioned embodiments. Various modifications can be made to the present invention without deviating from the scope of the invention.

The above-mentioned radiation detection element 5 may be replaced by a combination of a scintillator which emits light when illuminated with radiation and a photoelectric converter. The scintillator is made of rare-earth oxides such as $CdWO_4$. For example, the photoelectric converter has a structure in which a TFT (Thin Film Transistor) is overlaid on a photodiode. Preferably, a plurality of the scintillators and a plurality of the photoelectric converters are placed around the transmission window.

The above-mentioned probe cover 3 is configured of two members, that is, the cylindrical cover main body 3A, and the input plate 3C which closes the opening in the distal end of the cover main body 3A. However, the probe cover may be configured of a single cap-shaped integral member. In this case, the front wall disposed at the distal end of the probe cover is reduced in thickness to readily transmit the radiation, and a projection window similar to the projection window 3E is formed in the middle of the front wall. Such a probe cover is preferably made of a material which transmits the radiation. An example of such a material includes a metal material such as stainless steel or aluminum or an electrically conductive resin material. The front wall of the probe cover is preferably made of a material which blocks electromagnetic waves having an energy of 1 keV or less but transmits the radiation to be detected.

The ratio between the diameter and the length of the radiation detection probe is not limited to those in the examples shown in the figures, and may be modified as appropriate. The distal end portion of the radiation detection probe is not limited to a planar shape, and may be a rounded shape such as a spherical shape.

The radiation detector according to the above-mentioned embodiments is a medical surgical probe; however, the use of the radiation detector of the present invention is not limited thereto, and the radiation detector of the present invention may be employed in a wide range of other applications. For example, the radiation detector of the present invention may be employed to detect leakage of radioactivity at nuclear power plants or laboratories equipped with radioactive facilities.

INDUSTRIAL APPLICABILITY

When measuring radiation using the radiation detector in accordance with the present invention, the pointer light from the light-emitting device is emitted from the distal end of the probe onto a place to be measured. This allows the pointer light to indicate the place to be measured as a bright spot. This makes it possible to readily determine the place from which the radiation is being detected from a position away from the place to efficiently measure the radiation.

The invention claimed is:

1. A radiation detector comprising:
a main body; and
a radiation detection probe connected to the main body, the radiation detection probe including:
a radiation detection element for detecting radiation transmitted through the distal end of the radiation detection probe;
a light-emitting device for emitting pointer light toward the distal end of the radiation detection probe; and
a first window provided on the distal end of the radiation detection probe to transmit the pointer light;

wherein
the radiation detection element is disposed between the distal end of the radiation detection probe and the light-emitting device,
the radiation detection element has a second window for transmitting the pointer light, and
the pointer light passes through the second window and then the first window to be emitted from the radiation detection probe.

2. The radiation detector according to claim 1, wherein the radiation detection element is divided into a plurality of element pieces which are arranged to surround the second window.

3. The radiation detector according to claim 1, wherein the radiation detection probe further includes a condenser lens provided in the first window.

4. The radiation detector according to claim 1, further comprising an optical guide for guiding the pointer light from the light-emitting device to the first window.

5. The radiation detector according to claim 4, wherein the optical guide has a pipe extending from the light-emitting device to the first window.

6. The radiation detector according to claim 5, wherein an optical fiber is placed in the pipe.

7. The radiation detector according to claim 4, wherein the radiation detection probe further includes a light-blocking cover which covers the light-emitting device, and
the optical guide has a through-hole provided in the light-blocking cover.

8. The radiation detector according to claim 1, wherein the radiation detection probe further includes a collimator disposed between the distal end of the radiation detection probe and the radiation detection element to collimate the radiation.

9. The radiation detector according to claim 8, wherein the first window is placed on the center axis of the collimator.

10. A radiation detector comprising:
a main body; and
a radiation detection probe connected to the main body, the radiation detection probe including:
a radiation detection element for detecting radiation transmitted through the distal end of the radiation detection probe;
a light-emitting device for emitting pointer light toward the distal end of the radiation detection probe; and
a first window provided on the distal end of the radiation detection probe to transmit the pointer light;

wherein
the radiation detection probe further includes an input plate provided on the distal end of the radiation detection probe,
the first window is a through-hole provided in the input plate, and
the input plate blocks an electromagnetic wave having an energy of 1 keV or less.

11. The radiation detector according to claim 10, wherein the radiation detection element is disposed between the distal end of the radiation detection probe and the light-emitting device,
the radiation detection element has a second window for transmitting the pointer light, and
the pointer light passes through the second window and then the first window to be emitted from the radiation detection probe.

12. The radiation detector according to claim 11, wherein the radiation detection element is divided into a plurality of element pieces which are arranged to surround the second window.

13. The radiation detector according to claim 11, wherein the radiation detection probe further includes a condenser lens provided in the first window.

14. The radiation detector according to claim 11, further comprising an optical guide for guiding the pointer light from the light-emitting device to the first window.

15. The radiation detector according to claim 14, wherein the optical guide has a pipe extending from the light-emitting device to the first window.

16. The radiation detector according to claim 15, wherein an optical fiber is placed in the pipe.

17. The radiation detector according to claim 14, wherein the radiation detection probe further includes a light-blocking cover which covers the light-emitting device, and
the optical guide has a through-hole provided in the light-blocking cover.

18. The radiation detector according to claim 11, wherein the radiation detection probe further includes a collimator disposed between the distal end of the radiation detection probe and the radiation detection element to collimate the radiation.

19. The radiation detector according to claim 18, wherein the first window is placed on the center axis of the collimator.

* * * * *